Dec. 27, 1966     M. H. MATHISEN     3,294,421
SWAY CONTROL MEANS FOR TRAILERS
Filed April 15, 1966     4 Sheets-Sheet 1
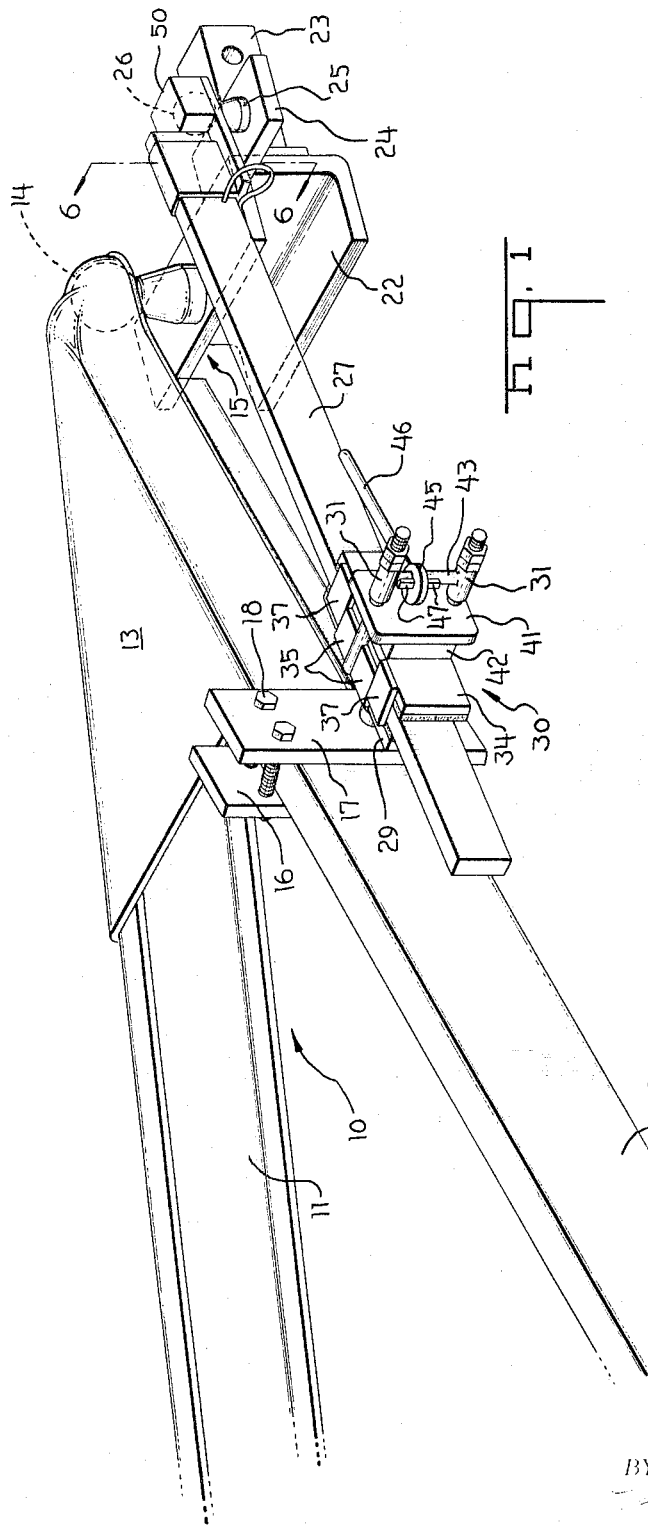
INVENTOR.
MARTIN H. MATHISEN
BY Dec. 27, 1966    M. H. MATHISEN    3,294,421
SWAY CONTROL MEANS FOR TRAILERS
Filed April 15, 1966    4 Sheets-Sheet 2
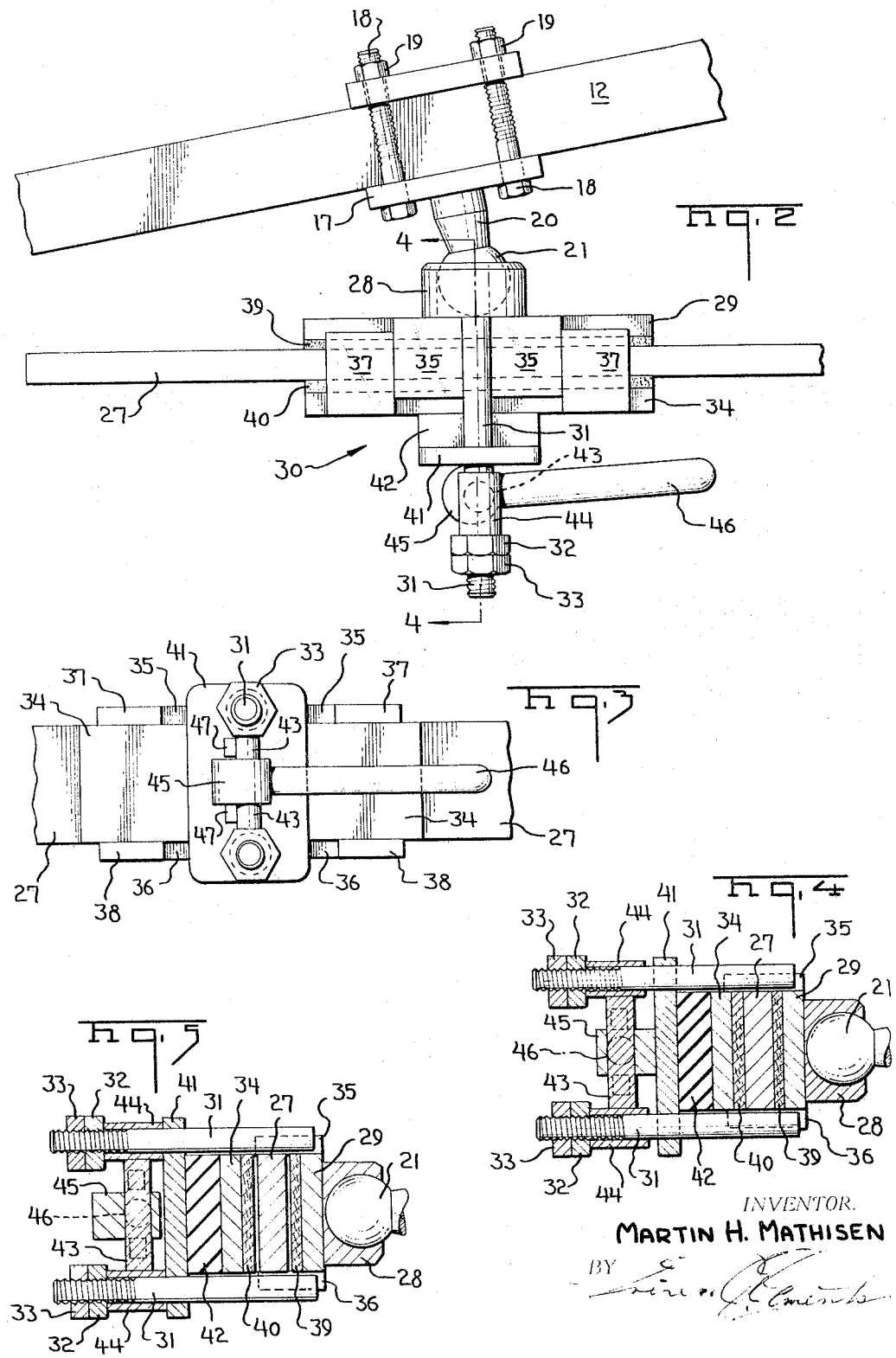
INVENTOR.
MARTIN H. MATHISEN

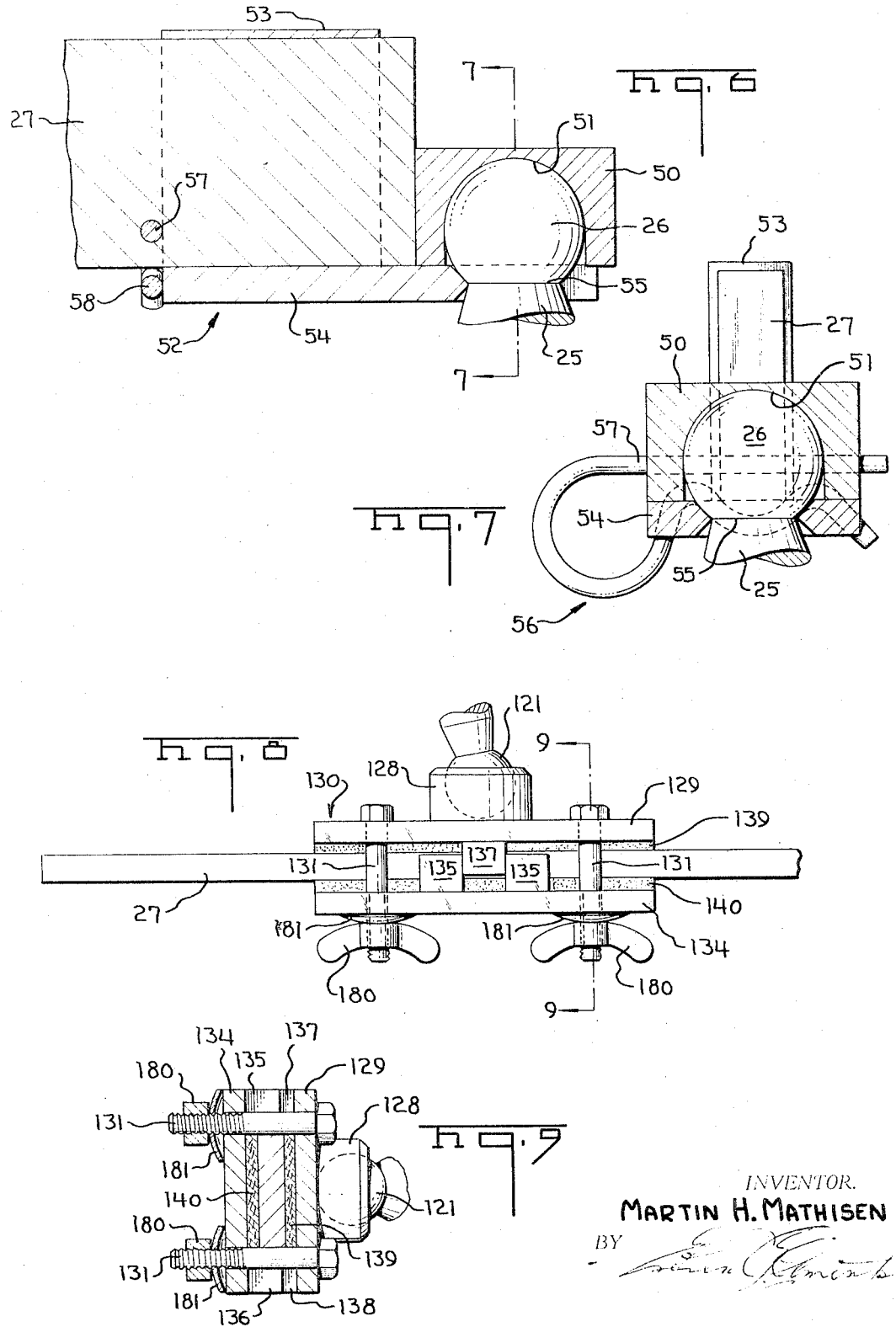

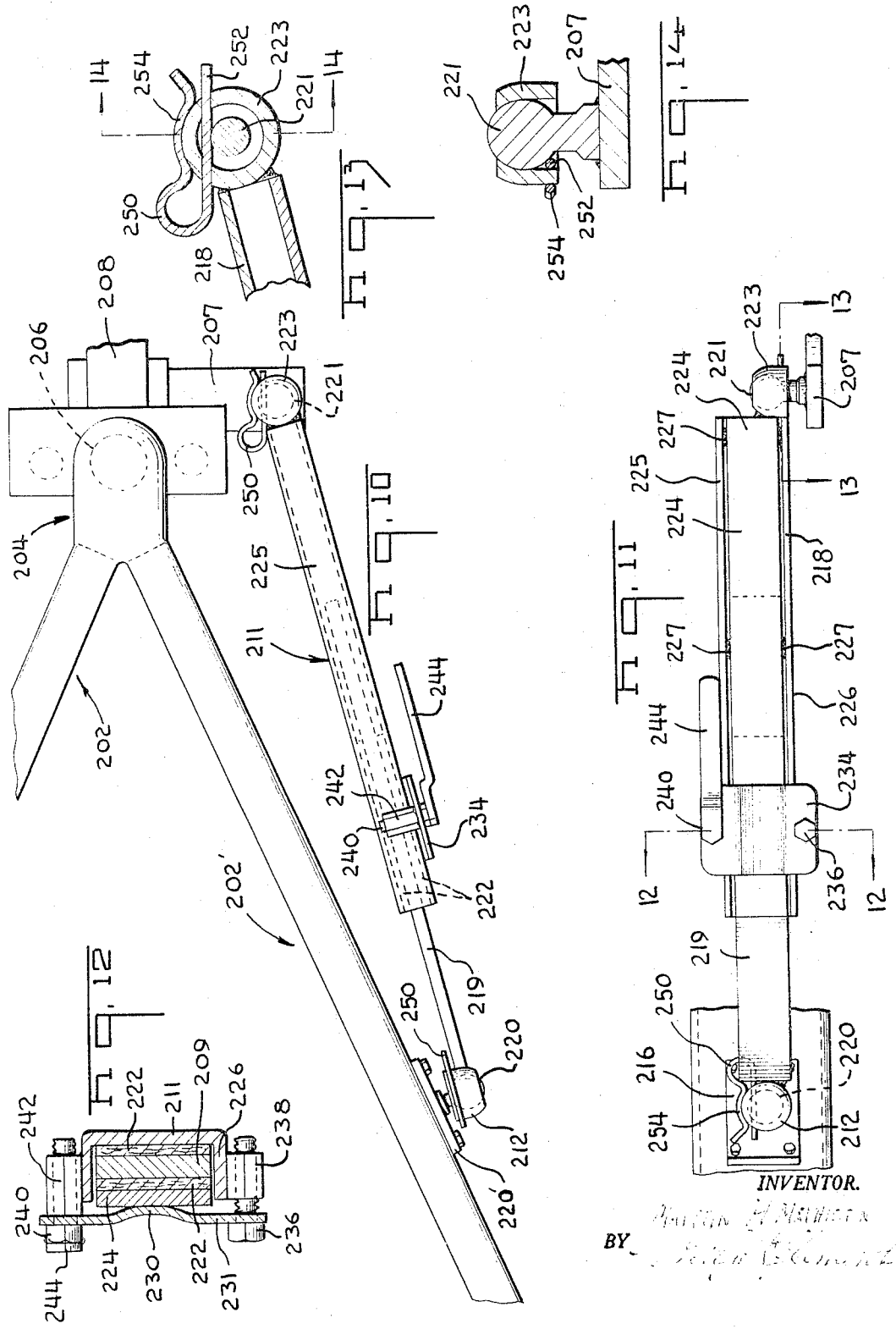

United States Patent Office 3,294,421
Patented Dec. 27, 1966

3,294,421
SWAY CONTROL MEANS FOR TRAILERS
Martin H. Mathisen, Sun Valley, Calif., assignor to Eaz-Lift Spring Corporation, Sun Valley, Calif., a corporation of California
Filed Apr. 15, 1966, Ser. No. 549,107
17 Claims. (Cl. 280—446)

This application is a continuation-in-part of my prior filed co-pending application entitled Sway Control Means for Trailers, Ser. No. 359,566, filed Apr. 14, 1964 and now abandoned.

This invention relates to sway control means for trailers. The sway control means of this invention is readily attached between the tractor member and the trailer member of a tractor-trailer train extend therebetween. In towing mobile loads by means of a truck, tractor, passenger car or other vehicle over rough and winding roads often causes the trailer or trailing vehicle to weave and sway. Such motion creates a dangerous situation or hazard for the driver of the towing vehicle sometimes even resulting in jack-knifing of the vehicles. In addition to the above noted examples in use, some sway may even be caused by side winds and/or by fast down hill travel.

A load equalizing hitch is not essential for use with the sway control of this invention, as the new sway control operates either with or without a load equalizing means.

An object of this invention is the provision of a sway control member between a towing vehicle and a towed vehicle which employs a friction member to adjustably retard and thus prevent swaying or undue swinging of the towed vehicle.

An additional object is the provision of a bar of rectangular cross section universally connected to one of the vehicles allowing three degrees of freedom between the bar and vehicle.

A further object of this invention is the provision of a set of brake shoe members at one side of the trailer tongue and slidably connected with a bar of rectangular cross section and having three degrees of freedom, said brake shoe member and said bar being pivotally connected to both the towing vehicle and said trailer.

Another object of this invention is the provision of a brake means adjustably and flexibly mounted on a trailer tongue and frictionally engageable with a bar of rectangular cross section flexibly mounted on a towing vehicle with means to adjust the frictional engagement of the brake means.

Still another object of this invention is the provision of a telescopic bar connected between a towing and a towed vehicle and including brake means, said brake means embracing and frictionally engaging the bar with manually operated means for adjusting the frictional engagement.

These and other objects will become apparent when considering the following specification taken with the accompanying drawings forming a part thereof, and taken together comprising a complete disclosure of my invention.

In the drawing, wherein like elements are indicated by like characters of reference in the several views:

FIG. 1 is an axonometric view of a conventional trailer hitch with the device of this invention added thereto;

FIG. 2 is a fragmentary plan view showing the connection of the sway controller to the trailer tongue;

FIG. 3 is a fragmentary side elevation of parts shown in FIG. 2;

FIG. 4 is a section substantially on the line 4—4 of FIG. 2, showing the brake applied;

FIG. 5 is a view similar to FIG. 4, showing the brake released;

FIG. 6 is a fragmentary section showing the connection of the sway control bar to a towing vehicle taken on the line 6—6 of FIG. 1;

FIG. 7 is a section on the line 7—7 of FIG. 6;

FIG. 8 is a fragmentary view showing a modified form of adjusting means of the brake means for the sway control;

FIG. 9 is a section on the line 9—9 of FIG. 8;

FIG. 10 is a view similar to FIG. 1, of a modified form of my invention wherein the parts operate in reverse relation;

FIG. 11 is a view in side elevation of the form shown in FIG. 10;

FIG. 12 is a section taken on line 12—12 of FIG. 11;

FIG. 13 is a section taken on line 13—13 of FIG. 11; and

FIG. 14 is a section taken on the line 14—14 of FIG. 13.

Referring now to FIG. 1, a conventional trailer tongue 10 has converging sides 11, 12 and a forward cover plate 13. At the forward end of the plate 13 there is a downwardly facing socket engageable with the usual ball 14 on the trailer hitch 15 of the towing vehicle. A pair of plates 16, 17 is attached to the tongue side 12, one on either side thereof, by means of bolts 18 having suitable nuts 19 thereon to tighten the plates 16, 17 in clamping engagement with the side bar 12. A stem 20 having a ball 21 at the free end thereof, is fixedly attached as by welding, to the plate 17 for a purpose later to be described.

The trailer hitch 15 on the towing vehicle in this case is a rearwardly facing channel member 22 attached to a draw bar 23. A plate 24 is suitably fixedly mounted on the trailer hitch 15 and carries an upstanding stud 25 having a ball 26 at the free end thereof. A sway control bar 27 of rectangular cross section is connected between the ball 21 and the ball 26 permitting said bar at least three degrees of freedom at either connection. These connections will now be described. A socket member 28 is mounted for universal movement on the ball 21. The socket 28 is fixedly mounted on a plate 29 which constitutes one element of a brake assembly 30. A pair of stud members 31 is attached to the plate 29 as by welding and extends laterally outwardly therefrom. A nut 32 and lock nut 33 are provided on the outer end of each stud 31 (see FIG. 4), to limit the movement of the other brake member 34. The brake member or plate 29 is provided with upper and lower flange members 35 and 36, as by welding, which extend over and under the bar 27 and the other brake member. The other brake member or plate 34 is provided with a pair of spaced upper and lower flanges 37 and 38 extending across the bar 27 and the other brake member, and abut opposite ends of the intermediate upper and lower flange members 35 and 36. As is shown these brake members 29 and 34 are respectively provided with suitable friction material 39 and 40 on the face of each that faces the sway control bar 27.

A rigid front pressure applying plate 41 has a backing pad 42 formed of suitable elastomeric material both of which are mounted between the studs 31 to be in desired pressure engagement with the adjacent brake member 34. A vertical bar 43 is rigidly attached at its opposite ends to a pair of sleeves 44 between which it extends with the sleeves 44 slidably mounted on the studs 31. A horizontal cam 45 is rotatably mounted on this bar 43 and has an operating handle 46 extending radially outwardly therefrom so as to rotate same on the vertical bar 43 to vary the pressure of the plates 41 and 42 on the brake member 34 when swung to the desired amount. The cam 45 is preferably shaped and arranged relative to the handle so that the high point thereof goes beyond center in the position shown in FIG. 5, to exert maximum pressure. By turning this handle therefor to the position shown in FIG. 3, the brake members 29, 34 are engaging the bar 27 with this maximum friction. By turning the handle to the left, in FIG. 3, approximately 180°, the brake members 29, 34 will be released from engagement with the bar 27, as is shown in FIG. 5. A pair of stops 47 is mounted on the bar 43 to center and maintain the cam 45 between the ends of said bar 43.

A modified means for adjusting the brake members is shown in FIGS. 8 and 9 wherein a brake member 129 is provided with a socket 128 engaging a ball 121 in a manner similar to the brake member 29 and the ball 21 and socket 28 heretofore described. A movable brake member 134 is slidably mounted on studs 131. The brake member 129 is provided with a pair of flanges 137, 138 overhanging the bar and brake member 134 and provided with pairs of flanges 135, 137 abutting flanges 137, 138 and extending over the bar in a manner similar to flanges 35, 36, 37, 38 heretofore described. The brake members 129 and 134 are respectively provided with friction material 139 and 140. The adjustment of the brake member 134 is made by means of wing nuts 180 operating against spring washers 181.

Bar 27 is provided at one end with a block 50 having a semispherical socket 51 therein for engagement over the ball 26. A ball lock 52 has a sleeve portion 53 embracing the bar 27 and a bifurcated portion 54 which engages the neck 55 of the stud 25 to prevent lifting of the socket 51 off the ball 26. A somewhat U-shaped spring 56 having an arm 57 mounted in the bar 27 and the other arm 58 in engagement with the portion 54 of the ball lock 52, causes the bifurcated member to engage and bear against the neck 55 of the ball stud 25 to hold the parts in operative position.

Referring now to FIG. 10 there is here shown a conventional trailer tongue 202 having converging side portions 202′ and a downwardly opening socket 204 engaging over the usual ball 206 on the trailer hitch 208 of the towing vehicle. The sway controller of this form of the invention comprises a bar 219 preferably rectangular in cross section and mounted for universal pivotal movement on one side portion of the tongue side 202′ by means of a ball 220 and an associated socket joint 212. The socket element 212 is secured to the outer end of the bar 209 by any suitable means but is here shown as welded thereto. The ball element 220 is welded to a plate 220′ which is bolted to one side of the tongue 202. The elongated tubular friction producing means 211 has on its inner side thereof a pair of brake shoe means 222 secured in contact with opposite sides of the bar 219 which with the tubular member 211 is mounted for universal pivotal movement on one side of the trailer hitch 207 by means of a ball 221 and an associated socket joint 223 which joint is welded on the end of the tubular member 211. Hence, it will be noted that the tubular bar 211 comprises two main portions, the elongated channel bar element 211 which is of C-shaped channel section in cross section or such other sectional shape as may be deemed more adaptable to engineering and manufacturing procedure see FIG. 12. Secured thereto at and near the outer end is a spring and a side closure plate 224 welded at spaced points to the top and bottom flanges 225, 226 of this channel bar 211 as at 227. This closure plate 224 is preferably comprised of spring steel and is secured at the four points only near the outer end of the channel bar 211 leaving the opposite inner end thereof free to be flexed as shown in FIG. 12. This closure plate 224 and the C-shaped channel bar together provide a tubular structure which has secured therein the opposed faces thereof, friction elements 222 composed of any suitable well-known type of brake shoe material so as to frictionally engage opposite faces of bar 219. The degree of frictional engagement is regulated or controlled by the pressure spring plate 231. The bowed intermediate portion 230 of the spring plate 231 is thus urged against the outer end of the spring steel closure plate 224 by a cap screw 236 threaded into a nut 238 welded to lower flange 226 of the channel member 211 and extending through an opening in the spring plate 231. A cap screw 240 extends through an opening in the opposite side of the spring plate 231 and is threaded into a nut 242 welded to the flange 225 of the channel 211. A handle 244 is welded to the head of screw 240. The nut 238 extends only to the end of the flange 226 while the nut 242 extends beyond flange 225 to operate as a stop of the plate 231. With the parts as shown in FIG. 12 the cap screw 236 is tightened to provide the required pressure on the spring to flex the free end of the closure plate 224 toward the base of the channel section 211 to thereby provide the desired frictional engagement of the friction elements 222 on bar 219. Rotation of handle 244 quickly releases the pressure of plate 231 on the spring closure plate 224.

The ball member 221 is welded to the mounting plate 207 secured as by welding or otherwise to the trailer hitch 208. The ball members 221 and 220 are retained in their respective socket joint members by quick release clips 250 having a straight leg 252 extending through aligned openings in the socket joint members and having a deformed leg contoured as at 254 to snugly fit around the outer surface of the socket members. The legs are connected by a curved bight portion to provide resiliency for springing the contoured leg over the socket. The clips can be readily withdrawn to allow quick removal of the sway bar from the towing and towed vehicles.

By the construction above, I have provided a sway control means which accommodates itself to rotational twist about a longitudinal axis running through the towing vehicle and the towed vehicle, and it also accommodates itself to changing differences of level or angular positions of one vehicle relative to the other in substantially vertical planes. The device also accommodates itself readily to easy turns, as in negotiating normal curves on a road. However, by suitable adjustment of the brake members sudden changes of direction of one vehicle relative to the other will be resisted to such a degree that dangerous or hazardous sway does not result.

I claim:

1. A sway controller between a towed vehicle and a towing vehicle wherein said towed vehicle is provided with a trailer tongue member and said towing vehicle is provided with a trailer hitch member comprising a bar mounted for universal pivotal movement on one of said members, brake shoe means mounted for universal pivotal movement on the other of said members in frictional engagement with said bar, and means for controlling the degree of frictional engagement between said bar and brake shoe means.

2. A device as defined in claim 1 wherein the bar is mounted on the hitch and the brake shoe means is mounted on the tongue.

3. A structure as defined in claim 1 wherein the bar is rectangular in cross-section and the brake shoe means comprises a pair of friction shoes, one engaging each side face of the bar.

4. The structure as defined in claim 3 wherein the friction shoes comprise rectangular metal plates having opposed faces lined with suitable friction material.

5. The structure as defined in claim 3 wherein the means for adjusting the degree of friction includes a fixed friction shoe and a movable friction shoe and means moving the movable friction shoe toward the fixed friction shoe.

6. The structure as defined in claim 5 including a cam means mounting said cam adjacent the movable friction shoe for rotation about an axis parallel to the faces of the friction shoe toward the fixed friction shoe and said shoes into frictional engagement with said bar.

7. The structure as defined in claim 6 wherein the means for mounting the cam comprises a pair of rods mounted on the fixed friction shoe, stop means at the free ends of said rods, a bar having end portions slidably mounted on said rods, a cover plate movable toward said movable shoe and said cam being rotatably mounted on said bar and having a handle for manual operation thereof.

8. The structure as defined in claim 5 including a plurality of bolts mounted in openings in the fixed friction shoe and passing through openings in the movable friction shoe, spring washers and wing nuts on the outer ends of the bolts for adjusting the engagement of said friction shoes relative to said bar.

9. The structure as defined in claim 1 wherein the mounting of the sway control bar adjacent the trailer hitch comprises a ball and socket joint, and wherein the mounting of the brake means relative to the trailer tongue comprises a ball and socket joint.

10. The structure as defined in claim 9 including a bifurcated latch member slidably mounted on said sway control bar and engaging the ball joint member adjacent said trailer hitch to retain said sway control bar in engagement with said ball joint member, and spring means urging said latch toward said ball joint member.

11. A device as defined in claim 1 wherein the friction producing means comprises an elongated channel member having a friction element secured thereto, a spring closure plate having a friction element secured thereto, and means yieldably securing the spring closure plate to the flanges of the channel member with the friction elements in spaced opposed position within the channel thereof.

12. A device as defined in claim 11 wherein the channel member is a U-shaped bar member and the spring closure plate is welded near one end thereof to the top and bottom flanges of the U-shaped bar.

13. A device as defined in claim 11 wherein the means for controlling the degree of frictional engagement comprises an adjustable bridging member in bearing engagement with the spring closure plate, means at one edge of the plate for adjusting the force of the bearing engagement with said plate, and means at an opposed edge of the plate for quickly releasing said force of engagement.

14. A device as defined in claim 13 wherein the means for adjusting the force of engagement comprises a nut secured to one flange of the channel and a bolt extending through the bridging member and into threaded engagement with the nut.

15. A device as defined in claim 13 wherein the means for quickly releasing the force of engagement comprises a nut secured to one flange of the channel, a bolt extending through the nut and into threaded engagement with the nut, and a handle fixedly secured to the bolt.

16. A device as defined in claim 1 wherein the mounting for universal pivotal movement comprises a ball secured to each of said members, a socket secured to each said bar and brake shoe means, and means for retaining each ball in the respective socket.

17. A device as defined in claim 16 wherein the retaining means comprises a pair of aligned openings in the sockets and a retaining clip having one leg extending through said openings and another leg contoured about the sockets.

References Cited by the Examiner

UNITED STATES PATENTS

| 2,699,956 | 1/1955 | Mattson | 280—457 |
| 2,808,272 | 10/1957 | Reese | 280—406 |
| 3,194,584 | 7/1965 | Reese | 280—406 |

FOREIGN PATENTS

| 695,898 | 9/1940 | Germany. |
| 840,845 | 7/1960 | Great Britain. |

LEO FRIAGLIA, *Primary Examiner.*